United States Patent
Alezzani et al.

(10) Patent No.: US 12,423,136 B2
(45) Date of Patent: Sep. 23, 2025

(54) SYSTEM AND METHOD FOR WIRELESSLY PERFORMING SOFTWARE-BASED TASKS ON VEHICLES

(71) Applicant: Ford Global Technologies, LLC, Dearborn, MI (US)

(72) Inventors: Jamal Alezzani, Belleville, MI (US); Jason Michael Miller, Woodhaven, MI (US); Priyank Shah, West Bloomfield, MI (US); Basavaraj Tonshal, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 619 days.

(21) Appl. No.: 17/869,250

(22) Filed: Jul. 20, 2022

(65) Prior Publication Data
US 2024/0028391 A1 Jan. 25, 2024

(51) Int. Cl.
*G06F 9/48* (2006.01)
*G07C 5/08* (2006.01)

(52) U.S. Cl.
CPC ............ *G06F 9/4881* (2013.01); *G07C 5/08* (2013.01)

(58) Field of Classification Search
None
See application file for complete search history.

(56) References Cited

U.S. PATENT DOCUMENTS

| | | | | |
|---|---|---|---|---|
| 8,301,334 B2* | 10/2012 | Knapp | ................... | G01M 17/06 340/539.22 |
| 9,088,572 B2* | 7/2015 | Ricci | ..................... | H04L 65/611 |
| 9,557,981 B2* | 1/2017 | Throop | ................... | G06F 8/654 |
| 9,762,470 B2* | 9/2017 | Alam | ....................... | H04L 43/10 |
| 10,061,574 B2* | 8/2018 | Mueller | ................. | G06F 8/654 |
| 10,663,977 B2* | 5/2020 | Cheng | ................... | G05D 1/0011 |
| 10,706,645 B1* | 7/2020 | Herron | ................. | G07C 5/0825 |
| 11,270,233 B2* | 3/2022 | Schondorf | ............ | G06Q 10/06 |
| 2010/0161172 A1* | 6/2010 | Bjelkstal | ................ | G07C 5/008 701/31.4 |

FOREIGN PATENT DOCUMENTS

| | | |
|---|---|---|
| CN | 111555953 | 8/2020 |
| CN | 112787893 | 5/2021 |
| WO | 2021109476 | 6/2021 |

* cited by examiner

*Primary Examiner* — Van H Nguyen
(74) *Attorney, Agent, or Firm* — Burris Law, PLLC (57) ABSTRACT

A system for testing-configuring one or more vehicles includes a task communication module obtaining a task data packet having a selected software-based task to be performed on a selected vehicle, where a task command identifier identifying the task, a command matching module selecting a predefined task command from among a set of stored task commands based on the task command identifier where the predefined task command executes either a selected standardized protocol (i.e., a set of locally stored instructions) or a selected customized protocol to perform the task (i.e., a set of bypass instructions to retrieve a selected script file having a set of customizable instructions), and a command execution module executing the selected standard protocol in response to the predefined task command being the selected standard protocol, and executing the selected customized protocol employing the selected script file based on the predefined task command being the selected customized protocol.

20 Claims, 3 Drawing Sheets

SYSTEM AND METHOD FOR WIRELESSLY PERFORMING SOFTWARE-BASED TASKS ON VEHICLES

FIELD

The present disclosure relates to a vehicle diagnostic tester and a method thereof.

BACKGROUND

The statements in this section merely provide background information related to the present disclosure and may not constitute prior art.

Vehicles typically go through various testing and system configuration during their life. For example, over the years, vehicle manufacturing facilities have conducted end-of-line diagnostic testing and system configuration on vehicles. To conduct such tasks, a diagnostic tool is preprogrammed with software-based tasks to be performed on a vehicle. Communicating with a vehicle communication network (e.g., local interconnect network (LIN) or a controller area network (CAN)), the diagnostic tool executes tests and software configurations. This approach provides a one-to-one diagnostic tool to vehicle configuration The preprogrammed software of the diagnostic tool typically provides a limited number of software-based tasks to validate, configure, and update a vehicle during the build process. This in turn can limit the number of software tasks and respective methods of execution that can be performed on a vehicle during a given period of time without an expensive programming overhaul that can be both time consuming and costly. These and other issues related to testing and configuring vehicle are addressed by the present disclosure.

SUMMARY

This section provides a general summary of the disclosure and is not a comprehensive disclosure of its full scope or all of its features.

In one aspect of the present disclosure, a system for testing-configuring one or more vehicles includes one or more processors and one or more nontransitory computer-readable mediums storing instructions that are executable by the one or more processors. The one or more processors operate as a vehicle communication module, a task communication module, a validation module, a command matching module, and a command execution module. The vehicle communication module is configured to establish a communication link with a selected vehicle from among the one or more vehicles. The task communication module is configured to obtain a task data packet. The task data packet includes data indicative of a selected software-based task to be performed on the selected vehicle. The data includes a task command identifier identifying the selected software-based task. The validation module is configured to validate the task data packet using a file configuration validation process. The command matching module is configured to select a predefined task command from among a set of stored task commands based on the task command identifier in response to the task data packet being validated. The predefined task command is configured to execute either a selected standardized protocol or a selected customized protocol to perform the selected software-based task. The selected standardized protocol defines a set of locally stored instructions to perform the selected software-based task. The selected customized protocol defines a set of bypass instructions to retrieve a selected script file having a set of customizable instructions to perform the selected software-based task. The command execution module is configured to execute the selected standard protocol to perform the selected software-based task in response to the predefined task command being the selected standard protocol, and execute the selected customized protocol employing the selected script file to perform the selected software-based task based on the predefined task command and a task execution instruction in response to the selected predefined task command being the selected customized protocol. The task data packet includes data indicative of the task execution instruction when the selected software-based task is a customizable command.

Variations of this form, which may be implemented individually or in any combination, are provided below.

In some variations, the selected software-based task further includes manufacturing stage data indicative of a manufacturing stage at which to perform the selected software-based task, where the manufacturing stage data includes an identified phase of a manufacturing process, a workstation identification, or a combination thereof.

In some variations, the selected software-based task includes a first selected software-based task and a second selected software-based task to be performed on the selected vehicle, wherein the data further includes a first task command identifier identifying the first selected software-based task and a second task command identifier identifying the second selected software-based task.

In some variations, the command matching module is further configured to select a first predefined task command and a second predefined task command from among the set of stored task commands based on the first task command identifier and the second task command identifier, respectively, in response to the task data packet being validated. The first predefined task command is configured to execute a respective selected standardized protocol to perform the first selected software-based task and the second predefined task command is configured to execute a respective selected customized protocol to perform the second selected software-based task. The respective selected standardized protocol defines a respective set of locally stored instructions to perform the first selected software-based task. The respective selected customized protocol defines the set of bypass instructions to retrieve a respective selected script file having a respective set of customizable instructions to perform the second selected software-based task.

In some variations, the command execution module is further configured to: execute the respective selected standard protocol to perform the first selected software-based task; and execute the respective selected customized protocol employing the respective selected script file to perform the second selected software-based task based on the second predefined task command and the task execution instruction.

In some variations, the task execution instruction includes a script file name and a file path to obtain the selected script file.

In some variations, the file path includes data identifying an external file directory storing the selected script file.

In some variations, the selected script file includes at least one of an extensible markup language-type file, a hypertext markup language-type file, Lua script-type file, or a Host-Monitor-type file.

In some variations, the task data packet is a hypertext markup language file.

In some variations, the validation module is further configured to: validate the predefined task command using a task command validation process in response to the task data packet being valid, validate each parameter of the predefined task command using a parameter validation process in response the predefined task command being selected from among the set of stored task commands, and issue a notification in response to the predefined task command or a parameter being not valid.

In some variations, the one or more processors further operate as a report module configured to generate one or more status reports based on a progress of at least one of a status of a validation of the file configuration validation process, the status of a task command validation process, a status of the parameter validation process, or a combination thereof.

In another aspect of the present disclosure, a method for testing-configuring one or more vehicles includes establishing a communication link with a selected vehicle from among the one or more vehicles and obtaining a task data packet. The task data packet includes data indicative of a selected software-based task to be performed on the selected vehicle. The data includes a task command identifier identifying the selected software-based task. The method further includes validating the task data packet using a file configuration validation process and selecting a predefined task command from among a set of stored task commands based on the task command identifier in response to the task data packet being validated. The predefined task command is configured to execute either a selected standardized protocol or a selected customized protocol to perform the selected software-based task. The selected standardized protocol defines a set of locally stored instructions to perform the selected software-based task. The selected customized protocol defines a set of bypass instructions to retrieve a selected script file having a set of customizable instructions to perform the selected software-based task. The method further includes executing the selected standard protocol to perform the selected software-based task in response to the predefined task command being the selected standard protocol, and executing the selected customized protocol employing the selected script file to perform the selected software-based task based on the predefined task command and a task execution instruction in response to the selected predefined task command being the selected customized protocol. The task data packet includes data indicative of the task execution instruction when the selected software-based task is a customizable command.

Variations of this form, which may be implemented individually or in any combination, are provided below.

In some variations, the selected software-based task further includes manufacturing stage data indicative of a manufacturing stage at which to perform the selected software-based task, wherein the manufacturing stage data includes an identified phase of a manufacturing process, a workstation identification, or a combination thereof.

In some variations, the selected software-based task includes a first selected software-based task and a second selected software-based task to be performed on the selected vehicle, wherein the data further includes a first task command identifier identifying the first selected software-based task and a second task command identifier identifying the second selected software-based task.

In some variations, the method further includes selecting a first predefined task command and a second predefined task command from among the set of stored task commands based on the first task command identifier and the second task command identifier, respectively, in response to the task data packet being validated. The first predefined task command is configured to execute a respective selected standardized protocol to perform the first selected software-based task and the second predefined task command is configured to execute a respective selected customized protocol to perform the second selected software-based task. The respective selected standardized protocol defines a respective set of locally stored instructions to perform the first selected software-based task. The respective selected customized protocol defines the set of bypass instructions to retrieve a respective selected script file having a respective set of customizable instructions to perform the second selected software-based task. The method further includes executing the respective selected standard protocol to perform the first selected software-based task, and executing the respective selected customized protocol employing the respective selected script file to perform the second selected software-based task based on the second predefined task command and the task execution instruction.

In some variations, the task execution instruction includes a script file name and a file path to obtain the selected script file.

In some variations, the file path includes data identifying an external file directory storing the selected script file.

In some variations, the selected script file includes at least one of an extensible markup language file, a hypertext markup language file, Lua script file, or a HostMonitor file.

In some variations, the task data packet is a hypertext markup language file.

In some variations, the method further includes validating the predefined task command using a task command validation process in response to the task data packet being valid; validating each parameter of the predefined task command using a parameter validation process in response the predefined task command being selected from among the set of stored task commands; and issuing a notification in response to the predefined task command or a parameter being not valid.

In another aspect of the present disclosure, a method for testing-configuring one or more vehicles includes obtaining a task data packet, where the task data packet includes data indicative of a selected software-based task to be performed on the selected vehicle. The data includes a task command identifier identifying the selected software-based task. The method further includes validating the task data packet using a file configuration validation process and selecting a predefined task command from among a set of stored task commands based on the task command identifier in response to the task data packet being validated. The predefined task command is configured to execute either a selected standardized protocol or a selected customized protocol to perform the selected software-based task. The selected customized protocol defines a set of bypass instructions to retrieve a selected script file having a set of customizable instructions to perform the selected software-based task. The method further includes executing the selected standard protocol to perform the selected software-based task in response to the predefined task command being the selected standard protocol, and executing the selected customized protocol employing the selected script file to perform the selected software-based task based on the predefined task command and a task execution instruction in response to the selected predefined task command being the selected customized protocol. The task data packet includes data indicative of the task execution instruction when the selected software-based task is a customizable command. The task execution instruction includes a script file name and a file path to obtain the selected script file.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Vehicles may be equipped with wireless communication devices that establish wireless communication links with external devices that perform diagnostics, tests, software configuration, among other tasks. In a non-limiting example, such a wireless communication link may be based on diagnostic over internet protocol (DoIP). Execution of the various tasks can be challenging due to, for example, the number of vehicles, the different types of vehicles (e.g., make, model, etc.), the variation in tasks to be performed, among other factors.

The present disclosure provides a system and/or method to execute, create, and modify one or more software-based tasks to be performed on a selected vehicle. In one form, the execution of the tasks may be performed during an assembly build process of the vehicle, during a service check of the vehicle, and/or among other suitable times. The system and/or method leverages a set of stored logic task commands within a task execution controller (TEC), where the set of stored logic task commands are configured to execute either a selected standardized protocol and/or a selected customized protocol to perform the selected software-based task. The selected standardized protocol defines a set of locally stored instructions stored within the TEC to perform the selected software-based task. The selected customized protocol defines a set of bypass instructions to retrieve a selected script file having a set of customizable instructions from an external directory to perform the selected software-based task. As described herein, in one form, the system and/or method of the present disclosure provides the capability of taking a script file as an input, such as a LUA-type file, to execute a software-based task based on user defined or customizable criteria. With this capability, software-based tasks can be customized and defined outside a vehicle tester environment without the need to compile software-based tasks related command code.

Figure 1:
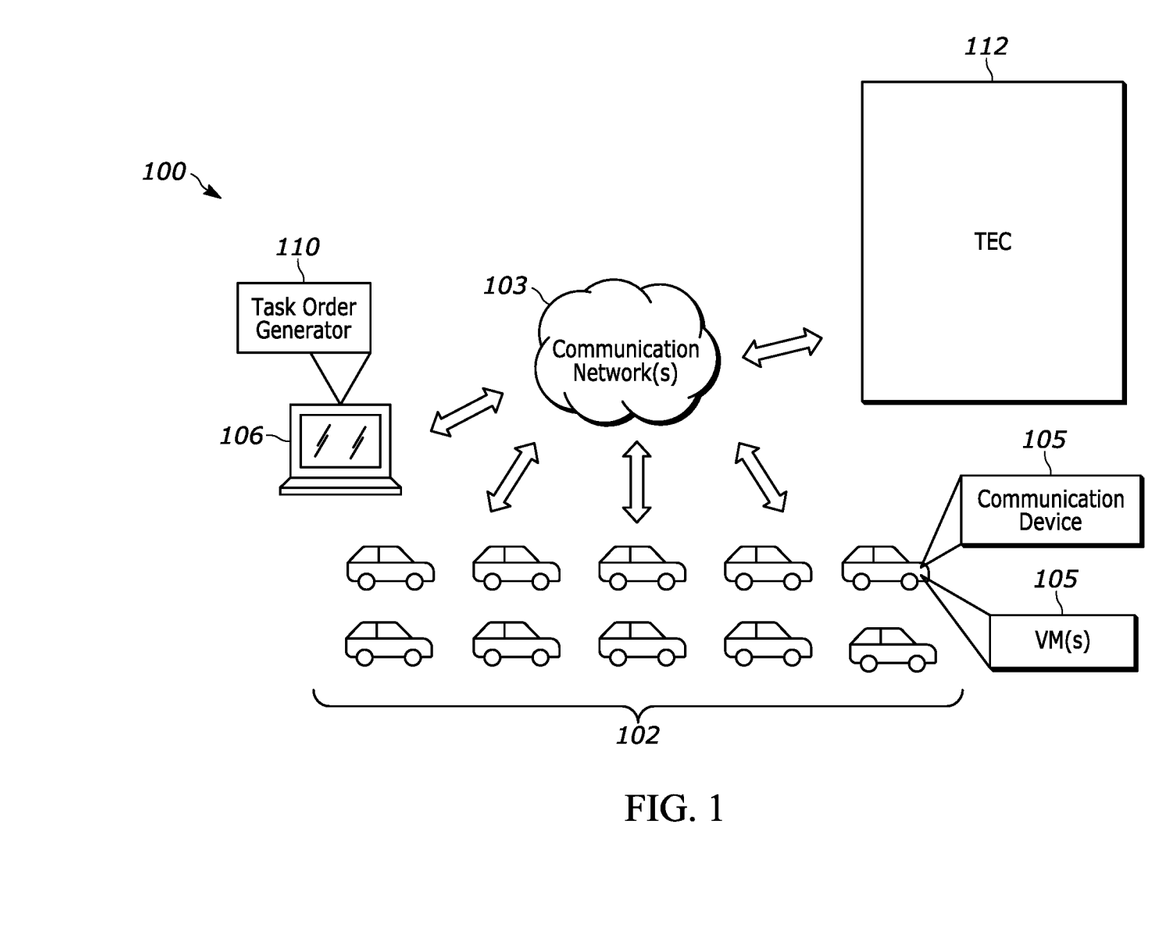
FIG. 1 illustrates an example system comprising a task execution controller (TEC) in communication with multiple vehicles, in accordance with the teachings of the present disclosure.

Referring to FIG. 1, the present disclosure provides an example system 100 comprising a TEC 112 configured to communicate with one or more vehicles 102 and execute a defined set of software-based tasks on the vehicle 102. In a non-limiting example, the software-based tasks may include vehicle software configuration, vehicle software updates, tests, and/or diagnostics, among other tasks. More particularly, in an example application, vehicles 102 provided in a manufacturing facility are configured to communicate with the system 100 via one or more communication networks 104 that employs wireless and/or wired communication links. Various wireless communication links may be employed such as, but not limited to, transmission control protocol (TCP), internet protocol (IP), cellular protocols, among others. In a non-limiting example, in using TCP/IP, the vehicles 102 are configured to employ DoIP. Accordingly, the vehicles 102 and the system 100 include software and/or hardware components (e.g., routers, transmitters, microprocessors, antenna, memory, interface ports, among other devices) for establishing the communication link. In addition, the facility may include gateway servers, routers, transmitters, antenna, interface ports, among other components for supporting the communication network 104. It should be readily understood that the system 100 for testing-configuring the vehicles 102 may be employed in other applications, such as at a vehicle service facility, and should not be limited to a manufacturing facility.

In one form, each vehicle 102 includes a communication device 106 that is configured to communicate with external devices via wired and/or wireless communication using one or more of the communication methods described above. The communication device 106 is configured to broadcast an introduction signal that includes data to uniquely identify the vehicle 102. In a non-limiting example, the data can include a vehicle identifier for the vehicle 102 (e.g., a vehicle identification number (VIN)), an entity identification (EID), and/or a communication identification (e.g., IP address). In one form, the communication device 106 is further configured to communicate with other devices/modules within the vehicle 102 via a vehicle communication network (not shown), such as LIN or CAN. Accordingly, the system 100 is able to establish a communication link with the vehicle 102 to manage and execute a defined set of tasks for the vehicle 102, as described herein.

As known, the vehicle(s) 102 are configured to include one or more vehicle modules (VM) that control/manage one or more systems in the vehicle 102. For example, VMs may include, but should not be limited to, a climate control module for controlling a heating, ventilation, air-conditioning system of the vehicle 102; a powertrain control module configured to control the powertrain (e.g., engine and/or motor, etc.) of the vehicle 102; and/or an audio-visual control system configured to control audio-visual devices within a passenger cabin of the vehicle 102. In one form, the VMs are communicably coupled to each other and other devices in the vehicle 102, such as the communication device 104, via the vehicle network, and each VM is associated with a unique VM identifier for identifying the VM. As described herein, the various VMs in the vehicle and even devices, like sensors disposed throughout the vehicle 102, may undergo software-based tasks per instructions from the TEC 112.

In one form, the TEC 112 receives a task data packet that includes data indicative of a selected software-based task to be performed on a selected vehicle. The task data packet can be generated in various suitable ways. For example, a user may generate a task data packet using a user interface device 108 (e.g., a computer, a mobile device) that is in communication with the system 100 and a task order generator 110 that is configured to display a graphical user interface designed to generate the task data packet. In another example, the task data packet may be provided by a vehicle managing system that is configured to manage execution of task orders for vehicles 102. An example of such a vehicle managing system is provided in co-pending application U.S. Ser. No. 17/572,814, filed Jan. 11, 2022, and titled "VEHICLE MANAGING SYSTEM FOR MANAGING VEHICLES TO BE TESTED-CONFIGURED AND METHOD THEREOF", which is commonly owned with the present application and the contents of which are incorporated herein by reference in its entirety.

In one form, the task data packet is a text-based file, such as a program file using one or more commands in a form of text lines. The task data packet includes data requesting to connect the TEC 112 to a selected vehicle and to start a command window within the TEC 112. In a non-limiting example, the task data of the task data packet includes the task command identifier, VM identifier of a selected VM of the selected vehicle to undergo the selected software-based task, and/or selected manufacturing stage data indicating a stage at which the selected software-based task is to be performed.

The software-based tasks may be provided as a standard command or a unique customizable command. A standard command corresponds to a predefined task to be performed on a selected vehicle, such as, but not limited to: a clear codes command to clear codes such as diagnostic trouble codes (DTC) in a register of a selected VM; a verification of DTC(s) command to confirm accuracy of a DTC; a DTC verification to perform a diagnostic related to a selected DTC; a data identifiers (DID) range value command; a ping command to send a generic message to obtain a response from the selected VM; a start communication test command to test a communication link with a selected VM of the vehicle; and/or a part-identification test command to perform a part identification test to verify hardware and/or software identification of a selected VM and/or components of the selected vehicle.

A unique customizable command include instructions to execute a customized task based on user defined criteria stored on an external directory (i.e., not stored at the TEC 112). In one form, the unique customizable command includes a task execution instruction that includes data indicative of a selected script file name and a file path to obtain the selected script file. The selected script file includes at least one of, but is not limited to, an extensible markup language type file, a hypertext markup language type file, LUA script-type file, or a HostMonitor script-type file. The file path includes data identifying an external file directory storing the selected script file.

In one form, the manufacturing stage data includes assembly phase data, workstation identification data, or a combination thereof. The assembly phase data identifies an assembly phase within the manufacturing process at which to perform the software-based task. For examples, assembly phases may include, but are not limited to, a chassis assembly phase, an engine assembly phase, a transmission assembly phase, and a body assembly phase. The workstation identification data identifies a selected workstation from among one or more workstations associated with the selected assembly phase, and the selected software-based task is to be performed at the selected workstation. It should be readily understood that the task data packet may not include a manufacturing stage data. For example, implementations of the TEC of the present disclosure that are outside of the manufacturing facility, may not use a manufacturing stage data.

In one form, the task data packet may include data identifying multiple software-based tasks to be performed on the selected vehicle. The multiple software-based tasks can be associated to one or more standardized commands, one or more unique customized command, or a combination thereof. That is, all of the software-based tasks are not required to be associated to only standardized commands or only unique customized command.

Figure 2:
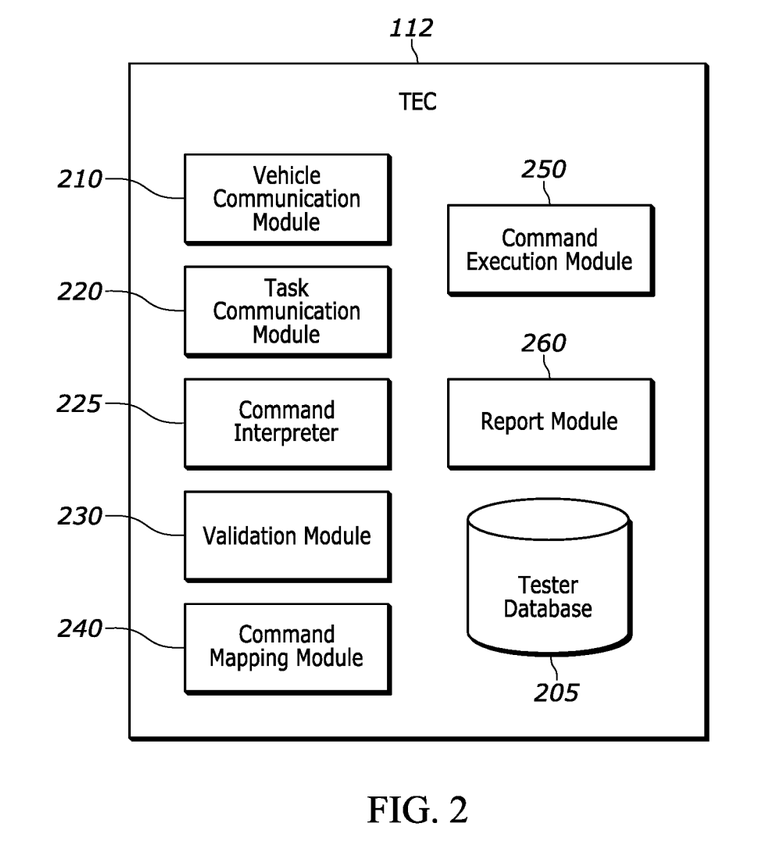
FIG. 2 is an example block diagram of the TEC, in accordance with the teachings of the present disclosure.

The TEC 112 is configured to execute the software-based tasks provided in the task data packet for a selected vehicle 102 that is communicably coupled to the TEC 112. Referring to FIG. 2, in one form, the TEC 112 is configured to include a tester database 205, a vehicle communication module 210, a task communication module 220, a command interpreter 225, a validation module 230, a command matching module 240, a command execution module 250, and a report module 260.

In one form, the tester database 205 is configured to store data related to the software-based tasks executable by the TEC 112. More particularly, the tester database 205 includes a set of predefined task commands (i.e., task command) executed by the TEC 112 to perform the software-based tasks. Each task command is associated with a respective task command identifier for the software-based task. As provided above, the software-based task may be a standard command or a unique customizable command. For each standard command, the tester database 205 stores a standardized protocol that is a set of locally stored instructions to perform a specific standard command or, more broadly, the selected software-based task. For the unique customizable command, the tester database 205 stores a customized protocol that defines a set of bypass instructions to retrieve a selected script file having a set of customizable instructions to perform the selected software-based task. In one form, the customized protocol retrieves the selected script file and temporally stores the selected script file at the tester database 205.

In one form, the vehicle communication module 210 is configured to establish a communication link with a selected vehicle from among vehicles 102. More particularly, the vehicle communication module 210 includes a set of communication nodes (i.e., one or more nodes; not shown), where each communication node is configured to communicate with a selected vehicle 102. Thus, the vehicle communication module 210 is able to communicate with multiple vehicles to execute respective tasks for the vehicles 102. In one form, the set of communication nodes are based on user datagram protocol (UDP), and the communication node is a wireless communication port. That is, in a non-limiting example, the communication nodes are provided as a datagram sockets. In one form, the vehicle communication module 210 selects a communication node based on the availabilities of the set of communication nodes. For example, the vehicle communication module 210 tracks which communication nodes are available, and which are unavailable (e.g., nodes that have been assigned a vehicle 102), and selects a communication node from among the available node to perform software-based tasks of the task data packet. In a non-limiting example, once a communication node is selected, the vehicle communication module 210 uses a communication address associated with the selected vehicle 102 under DoIP to establish a wireless communication link between the selected vehicle 102 and the selected communication node.

In one form, the task communication module 220 is configured to obtain a task data packet identifying a selected task to be performed on the selected vehicle from the user interface device 108. For example, the task communication module 220 may receive the task data packet from the task order generator 110 via the user interface device 108. It should be readily understood that the task data packet can be obtained from other devices and should not be limited to the task order generator 110 and/or the user interface device 108.

The command interpreter 225 is configured to analyze/read the task data packet to identify one or more selected software-based tasks to be performed on the selected vehicle. For example, the command interpreter is configured to identify specific textual data strings within the task data packet. In one form, the command interpreter 225 is configured to read the task data packet to initiate a validation check on the task data packet. In another form, the command interpreter 225 is configured to read the task data packet after the validation module 230 validates the task data packet.

The validation module 230 is configured to provide one or more validation checks on the task data packet. The one or more validation checks includes, in a non-limiting example, a file configuration validation process, a task command validation process, and/or a parameter validation process. The file configuration validation process is configured to validate the integrity of the task data packet by determining whether an error exists with the task data packet. That is, the file configuration validation process checks the data of the task data packet to determine whether the data is correct prior to the task data packet being executed. In a non-limiting example, the file configuration validation process is configured to validate a structure of the task data packet, command code type, command code, file grammar, file vocabulary, one or more syntax of the task data packet. In one example, the validation module 230 validates that the task data packet is a correct type of file and includes a correct value for the file. In one form, the file configuration validation process verifies the selected vehicle name, and an VM identifier associated with a selected VM is associated with the selected vehicle, and/or its respective list of VM. In one form, the file configuration validation process can be performed using a configuration validator tool or diagnostic tool, such as Markup Validator-type tool, an XML editor type tool, a New Relic Diagnostic CLI-type tool, CSS validator type-tool, link checker type-tool, or the like.

In one form, the validation module 260 is configured to prompt a user input to perform the command validation process in response to the file configuration validation process being valid. It is understood to one of ordinary skill in the art that the validation module 230 may automatically run the command validation process without the user permission if the file configuration validation process is valid.

The command validation process is configured to validate the selected software-based task identified in the task data packet in response to the task data packet being valid. For example, in one form, the command validation process determines whether the task command identifier(s) provided in the task data packet match with one or more task command identifiers for the task command stored in the task command database 205. In one form, if there is a match, the validation module 230 determines that the software-based task is valid and correlates with a task command in the database 205.

For task data packets having unique customizable commands, the data packets further includes the task execution instructions, and the parameter validation process is configured to check one or more parameters of the task execution instruction. In one form, the parameter validation process determines whether the script file associated with the unique customizable test command exists. In a non-limiting example, the parameter validation process verifies that each parameter of the task command is listed; verifies that each parameter has the correct format, syntax, and grammar; verifies that each parameter is listed in the correct order; verifies that a parameter range of a given parameter is within a specific range; and/or verifies a parameter format for a given parameter. In one form, to verify that the script file exists is in the external directory, the parameter validation process searches for the file path and/or the file name, and if the file path and/or file name are missing, the script file is not valid.

In one form, if any one of the file configuration validation process, the command validation process, and/or the parameter validation process is invalid, the validation module 230 may perform an action. Example actions by the validation module 230 may include issue a notification to the originator of the task data packet, discard the task data packet, have the vehicle communication module 210 end communication with the selected vehicle, and/or issue a notification to the vehicle, among other suitable actions.

The command matching module 240 is configured to select a predefined task command from among the set of prestored task commands based on the task command identifier provided in the task data packet in response to the task data packet being validated. In one form, the command matching module 240 identifies the software-based task and the associated task command identifier from the task data packet. The command matching module 240 then compares the task command identifier of task data packet with the task command identifiers stored in the tester database 205, and selects the predefined task command having the same task command identifier. In the event that the task data packet includes multiple task command identifiers for multiple software-based tasks to be performed, the command matching module 240 is configured to identify and select a predefined task command for each task command identifier in the task data packet.

The command execution module 250 is configured to execute either a selected standardized protocol or a selected customized protocol to perform the selected software-based task based on the selected predefined task command and the selected VM. Specifically, if the software-based task is a standard command, the selected predefined task command is a selected standard protocol stored in the databased 205 for the standard command. For example, if the standard command is indicative of clearing DTC codes in a powertrain module, the command execution module 250 retrieves the predefined task command, which is a standardize protocol, for the standard command from the database 205, and executes the commands on the powertrain module via the vehicle communication module 210. Alternatively, if the software-based task is a unique customizable command, the command execution module 250 executes the selected customized protocol that employs the selected script file to perform the selected software-based task based on the task execution instruction. Accordingly, the command execution module 250 is configured to execute a standard protocol stored in the database 205 for standard commands or the unique customizable protocol that includes instructions for locating and executing the unique customizable commands.

In one form, the report module 260 is configured to generate one or more status reports providing data related to, for example, one or more validation checks, execution of the predefined task commands, or a combination thereof. For example, the status reports may include information related to an error message to identify issues and errors within the task data packet, a selected task commands, and/or one or more parameters. In one form, the report module 260 issues a notification if an error is determined based at least, but not limited to, missing or incorrect data associated with a selected vehicle, an VM identifier, the structure, syntax, a command code, and/or the like. In one form, if an error is found, the report module 260 sets a notification indicating that an error exists and specific details regarding the error including, but not limited to, an error type and details of an error occurrence. In another example, the one or more status reports may include information related to whether the selected software-based task provided in the task data packet was completed. Such status reports can be provide provided to the originator of the task data packet or may be automatically stored in an external database.

Figure 3:
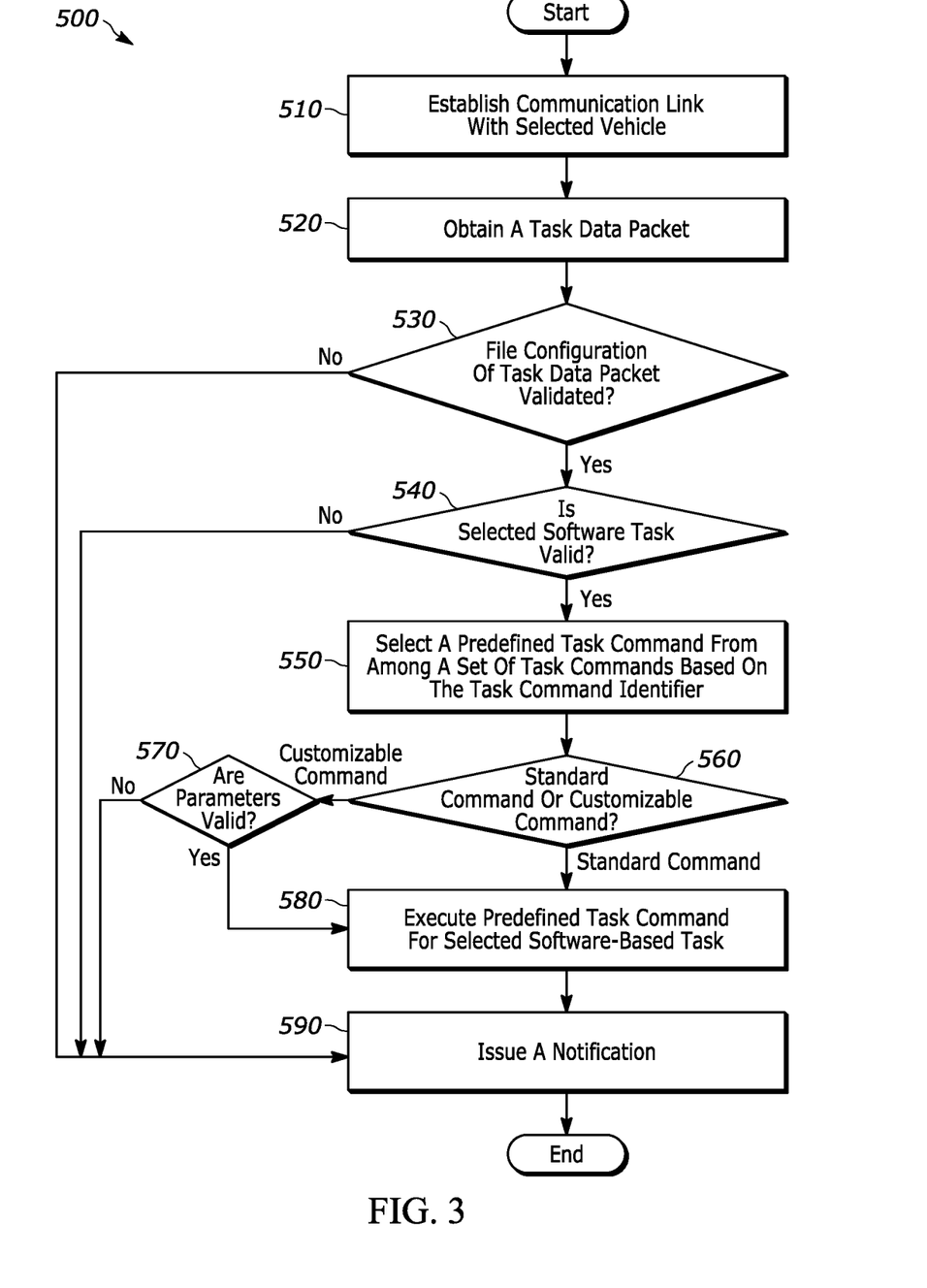
FIG. 3 is a flowchart of an example task execution control routine, in accordance with the teachings of the present disclosure.

Referring to FIG. 3, an example TEC routine 500 performed by a given TEC is provided. At 510, the TEC 112 establishes a communication link with a selected vehicle, and at 520, the TEC 112 obtains a task data packet. The task data packet includes data indicative of a selected software-based task to be performed on the selected vehicle. For example, the data includes a task command identifier identifying the selected software-based task and, in one form, a task execution instruction if the selected software-based task is a unique customizable command. At 530, the TEC 112 determines whether the task data packet is valid using a file configuration validation process. If an error is received during the file configuration validation process, the TEC issues a notification at 590 and the routine ends.

If the task data packet is valid, the TEC 112 determines whether a selected software-based task is valid at 540. If the selected software-based task is not valid, the TEC 112 issues a notification at 590 and the routine ends. At 550, in response to the selected software-based task being valid, the TEC 112 selects a predefined task command from among a set of predefined task commands of the TEC 112 based on the task command identifier of selected software-based task of the task data packet and a task identifier of a task command of the set of predefined task commands. After matching task command identifier of the task data packet with that of a predefined task command from among the set of stored task commands, the TEC 112 determines whether the predefined task command is related to a standardized command or a customizable command at 560. For example, the predefined task commend selected includes data indicating whether the predefined task command is indicative of a standardized command or a unique customizable command. If the predefined task command is related to a standardized command, the TEC 112 executes the predefined task command, at 580. On the other hand, if the predefined task command is related to a unique customizable command, the TEC 112 performs a parameter validation process on the task execution instruction at 570. If an error is detected, the TEC 112 issues a notification at 590, and the routine ends.

If the parameters are valid, the TEC 112 executes the predefined task command, at 580. For example, if the selected software-based task is a standard command, the predefined task command is associated with a standardized protocol that includes instructions to execute the standard command. On the other hand, if the selected software-based task is a unique customizable command, the predefined task command is associated with the unique customized protocol that employs the selected script file to perform the selected software-based task based on the task execution instruction.

It should be readily understood that the TEC 112 can be configured in various suitable ways to perform the operations described herein and should not be limited to the example routine of FIG. 3.

In an example iteration of the TEC routine 500 of FIG. 3, the TEC 112 receives a task data packet having a Collect Codes task for an audio-visual control system, where the Collect Codes task is associated with one of a plurality of predefined task commands identified as a standardized command of the TEC 112. At 510, the TEC 112 establishes a communication link with a selected vehicle and the TEC 112 obtains a task data packet at 520. The task data packet includes a task order having a task command identifier for identifying the Collect Codes task and a VM identifier for identifying an audio-visual control system (e.g., radio module) on which to perform the Collect Codes task for the selected vehicle. At 530, the TEC 112 determines whether the task data packet is valid using a file configuration validation process. If an error is received during the file configuration validation process, the TEC issues a notification at 590 and the routine ends.

If the task data packet is valid, the TEC 112 determines whether the Collect Codes task is valid at 540. If the Collect Codes task is not valid, the TEC 112 issues a notification at 590 and the routine ends. At 550, in response to the Collect Codes task being valid, the TEC 112 selects a predefined task command from among a set of predefined task commands of the TEC 112 based on the task command identifier associated with the Collect Codes task. After matching the task command identifier for the Collect Codes task provided in the task data packet with that of a selected predefined task command from the set of stored task commands, the TEC 112 determines whether the Collect Codes task command is related to a standardized command or a customizable command at 560 and executes the Collect Codes task command in response to the Collect Codes task command being a standardized command, at 580.

In another example utilizing the TEC routine 500 of FIG. 3, the TEC 112 receives a task data packet having a run customscrip.lua task for a powertrain module, where the run customscrip.lua task is associated with one of a plurality of predefined task commands being identified as a customizable command of the TEC 112. At 510, the TEC 112 establishes a communication link with a selected vehicle, and at 520, the TEC 112 obtains a task data packet for the selected vehicle. The task data packet includes data indicative of a run customscrip.lua task to be performed on the selected vehicle. For example, the data includes a task command identifier identifying the run customscrip.lua task and a task execution instruction having a file path and file name, such as in one form k:/TEC112/customtasksoftware-files/ping.lua. At 530, the TEC 112 determines whether the task data packet is valid using a file configuration validation process. If an error is received during the file configuration validation process, the TEC issues a notification at 590 and the routine ends.

If the task data packet is valid, the TEC 112 determines whether the run customscrip.lua task is valid at 540. If the run customscrip.lua task is not valid, the TEC 112 issues a notification at 590 and the routine ends. At 550, in response to the run customscrip.lua task being valid, the TEC 112 selects a predefined task command from among a set of predefined task commands of the TEC 112 based on the task command identifier associated with the run customscrip.lua task and a task identifier of a predefined task command of the set of predefined task commands. After matching the task command identifier, the TEC 112 determines whether the run customscrip.lua task command is related to a standardized command or a customizable command at 560 and performs a parameter validation process on the task execution instruction (e.g., k:/TEC112/customtasksoftwarefiles/ping.lua) to determine that the file path and the file name are valid in response to the task command being a customizable command, at 570. If an error is detected, the TEC 112 issues a notification at 590, and the routine ends. If the parameters are valid, the TEC 112 executes the run customscrip.lua task command, at 580 and, thereby, employs the ping.lua script file to perform the ping task based on the task execution instruction, k:/TEC112/customtasksoftwarefiles/ping.lua.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for testing-configuring one or more vehicles, the system comprising:
   one or more processors and one or more nontransitory computer-readable mediums storing instructions that are executable by the one or more processors, wherein the one or more processors operate as:
   a vehicle communication module configured to establish a communication link with a selected vehicle from among the one or more vehicles;
   a task communication module configured to obtain a task data packet, wherein the task data packet includes data indicative of a selected software-based task to be performed on the selected vehicle, wherein the data includes a task command identifier identifying the selected software-based task;
   a validation module configured to validate the task data packet using a file configuration validation process;
   a command matching module configured to:
   select a predefined task command from among a set of stored task commands based on the task command identifier in response to the task data packet being validated, wherein the selected predefined task command is configured to execute either a selected standardized protocol or a selected customized protocol to perform the selected software-based task, wherein the selected standardized protocol defines a set of locally stored instructions to perform the selected software-based task, wherein the selected customized protocol defines a set of bypass instructions to retrieve a selected script file having a set of customizable instructions to perform the selected software-based task; and
   a command execution module configured to:
   execute the selected standard protocol to perform the selected software-based task in response to the selected predefined task command being the selected standard protocol; and
   execute the selected customized protocol employing the selected script file to perform the selected software-based task based on the selected predefined task command and a task execution instruction in response to the selected predefined task command being the selected customized protocol, wherein the task data packet includes data indicative of the task execution instruction when the selected software-based task is a customizable command.

2. The system of claim 1, wherein the selected software-based task further includes manufacturing stage data indicative of a manufacturing stage at which to perform the selected software-based task, wherein the manufacturing stage data includes an identified phase of a manufacturing process, a workstation identification, or a combination thereof.

3. The system of claim 1, wherein the selected software-based task includes a first selected software-based task and a second selected software-based task to be performed on the selected vehicle, wherein the data further includes a first task command identifier identifying the first selected software-based task and a second task command identifier identifying the second selected software-based task.

4. The system of claim 3, wherein:
the command matching module is further configured to:
select a first predefined task command and a second predefined task command from among the set of stored task commands based on the first task command identifier and the second task command identifier, respectively, in response to the task data packet being validated, wherein the first predefined task command is configured to execute a respective selected standardized protocol to perform the first selected software-based task and the second predefined task command is configured to execute a respective selected customized protocol to perform the second selected software-based task, wherein the respective selected standardized protocol defines a respective set of locally stored instructions to perform the first selected software-based task, wherein the respective selected customized protocol defines the set of bypass instructions to retrieve a respective selected script file having a respective set of customizable instructions to perform the second selected software-based task;
the command execution module further configured to:
execute the respective selected standard protocol to perform the first selected software-based task; and
execute the respective selected customized protocol employing the respective selected script file to perform the second selected software-based task based on the second predefined task command and the task execution instruction.

5. The system of claim 1, wherein the task execution instruction includes a script file name and a file path to obtain the selected script file.

6. The system of claim 5, wherein the file path includes data identifying an external file directory storing the selected script file.

7. The system of claim 6, wherein the selected script file includes at least one of an extensible markup language-type file, a hypertext markup language-type file, Lua script-type file, or a HostMonitor-type file.

8. The system of claim 1, wherein the task data packet is a hypertext markup language file.

9. The system of claim 1, wherein the validation module is further configured to:
validate the predefined task command using a task command validation process in response to the task data packet being valid;
validate each parameter of the predefined task command using a parameter validation process in response the predefined task command being selected from among the set of stored task commands; and
issue a notification in response to the predefined task command or a parameter being not valid.

10. The system of claim 9, wherein the one or more processors further operate as a report module configured to generate one or more status reports based on a progress of at least one of a status of a validation of the file configuration validation process, the status of a task command validation process, a status of the parameter validation process, or a combination thereof.

11. A method for testing-configuring one or more vehicles, the method comprising:
establishing a communication link with a selected vehicle from among the one or more vehicles;
obtaining a task data packet, wherein the task data packet includes data indicative of a selected software-based task to be performed on the selected vehicle, wherein the data includes a task command identifier identifying the selected software-based task;
validating the task data packet using a file configuration validation process;
selecting a predefined task command from among a set of stored task commands based on the task command identifier in response to the task data packet being validated, wherein the selected predefined task command is configured to execute either a selected standardized protocol or a selected customized protocol to perform the selected software-based task, wherein the selected standardized protocol defines a set of locally stored instructions to perform the selected software-based task, wherein the selected customized protocol defines a set of bypass instructions to retrieve a selected script file having a set of customizable instructions to perform the selected software-based task;
executing the selected standard protocol to perform the selected software-based task in response to the selected predefined task command being the selected standard protocol; and
executing the selected customized protocol employing the selected script file to perform the selected software-based task based on the selected predefined task command and a task execution instruction in response to the selected predefined task command being the selected customized protocol, wherein the task data packet includes data indicative of the task execution instruction when the selected software-based task is a customizable command.

12. The method of claim 11, wherein the selected software-based task further includes manufacturing stage data indicative of a manufacturing stage at which to perform the selected software-based task, wherein the manufacturing stage data includes an identified phase of a manufacturing process, a workstation identification, or a combination thereof.

13. The method of claim 11, wherein the selected software-based task includes a first selected software-based task and a second selected software-based task to be performed on the selected vehicle, wherein the data further includes a first task command identifier identifying the first selected software-based task and a second task command identifier identifying the second selected software-based task.

14. The method of claim 13, further comprising
selecting a first predefined task command and a second predefined task command from among the set of stored task commands based on the first task command identifier and the second task command identifier, respectively, in response to the task data packet being validated, wherein the first predefined task command is configured to execute a respective selected standardized protocol to perform the first selected software-based task and the second predefined task command is configured to execute a respective selected customized protocol to perform the second selected software-based task, wherein the respective selected standardized protocol defines a respective set of locally stored instructions to perform the first selected software-based task, wherein the respective selected customized protocol defines the set of bypass instructions to retrieve a respective selected script file having a respective set of customizable instructions to perform the second selected software-based task;
executing the respective selected standard protocol to perform the first selected software-based task; and executing the respective selected customized protocol employing the respective selected script file to perform the second selected software-based task based on the second predefined task command and the task execution instruction.

15. The method of claim 11, wherein the task execution instruction includes a script file name and a file path to obtain the selected script file.

16. The method of claim 15, wherein the file path includes data identifying an external file directory storing the selected script file.

17. The method of claim 16, wherein the selected script file includes at least one of an extensible markup language file, a hypertext markup language file, Lua script file, or a HostMonitor file.

18. The method of claim 11, wherein the task data packet is a hypertext markup language file.

19. The method of claim 11 further comprising
validating the selected predefined task command using a task command validation process in response to the task data packet being valid;
validating each parameter of the selected predefined task command using a parameter validation process in response to the selected predefined task command being selected from among the set of stored task commands; and
issue a notification in response to the selected predefined task command or a parameter being not valid.

20. A method for testing-configuring one or more vehicles, the method comprising:
obtaining a task data packet, wherein the task data packet includes data indicative of a selected software-based task to be performed on a selected vehicle, wherein the data includes a task command identifier identifying the selected software-based task;
validating the task data packet using a file configuration validation process;
selecting a predefined task command from among a set of stored task commands based on the task command identifier in response to the task data packet being validated,
wherein the selected predefined task command is configured to execute either a selected standardized protocol or a selected customized protocol to perform the selected software-based task, and
wherein the selected customized protocol defines a set of bypass instructions to retrieve a selected script file having a set of customizable instructions to perform the selected software-based task;
executing the selected standard protocol to perform the selected software-based task in response to the selected predefined task command being the selected standard protocol; and
executing the selected customized protocol employing the selected script file to perform the selected software-based task based on the selected predefined task command and a task execution instruction in response to the selected predefined task command being the selected customized protocol,
wherein the task data packet includes data indicative of the task execution instruction when the selected software-based task is a customizable command, and
wherein the task execution instruction includes a script file name and a file path to obtain the selected script file.

\* \* \* \* \*